(12) United States Patent
Kessler et al.

(10) Patent No.: US 11,568,501 B2
(45) Date of Patent: Jan. 31, 2023

(54) METHOD AND DEVICE FOR ASCERTAINING A TREATMENT PARAMETER OF A TEXTILE USING AN IMPURITY COMPOSITION AND A TEXTILE PROPERTY

(71) Applicant: Henkel AG & Co. KGaA, Duesseldorf (DE)

(72) Inventors: Arnd Kessler, Monheim am Rhein (DE); Lars Zuechner, Langenfeld (DE); Peter Schmiedel, Duesseldorf (DE); Christina Roeleke, Moenchengladbach (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 511 days.

(21) Appl. No.: 16/621,622

(22) PCT Filed: Jun. 5, 2018

(86) PCT No.: PCT/EP2018/064720
§ 371 (c)(1),
(2) Date: Dec. 11, 2019

(87) PCT Pub. No.: WO2018/228861
PCT Pub. Date: Dec. 20, 2018

(65) Prior Publication Data
US 2021/0148033 A1 May 20, 2021

(30) Foreign Application Priority Data

Jun. 12, 2017 (DE) .................... 10 2017 209 859.7
Jul. 26, 2017 (DE) .................... 10 2017 212 862.3

(51) Int. Cl.
*G06K 7/10* (2006.01)
*G06Q 50/10* (2012.01)
(Continued)

(52) U.S. Cl.
CPC ............. *G06Q 50/10* (2013.01); *D06F 33/32* (2020.02); *D06H 3/08* (2013.01); *G01N 21/94* (2013.01);
(Continued)

(58) Field of Classification Search
CPC .... G06N 20/00; G06F 33/32; G06K 7/10861; G06K 7/1489; G06K 19/027; G06K 19/0637; G01N 21/94; D06H 3/08
(Continued)

(56) References Cited

U.S. PATENT DOCUMENTS 6,488,155 B2   12/2002   Lawandy et al.
6,629,439 B2   10/2003   Woebkemeir
(Continued)

FOREIGN PATENT DOCUMENTS

CN     106149288 A    11/2016
DE     19855503 A1     6/2000
(Continued)

OTHER PUBLICATIONS

EPO, International Search Report issued in International Application No. PCT/EP2018/064720, dated Jul. 13, 2018.
(Continued)

*Primary Examiner* — Daniel St Cyr
(74) *Attorney, Agent, or Firm* — Lorenz & Kopf, LLP

(57) ABSTRACT

In particular, a method performed by one or more devices is disclosed, the method comprising: obtaining a first intensity information item (210) representative of a spectral image (208) resulting from an soiling (202, 302) of a textile (200, 304); obtaining a second intensity information item (212, 214) representative of a spectral image (216) characteristic of at least one property of at least one part of the textile (200, 304); determining at least one treatment parameter, wherein the determination of the treatment parameter takes place
(Continued)

dependent both on the composition of the soiling (202, 302) from the first intensity information item (210) and on the at least one property of at least the part of the textile (200, 304) from the second Intensity information item (212, 214); and outputting or triggering an outputting of the at least one treatment parameter.

18 Claims, 5 Drawing Sheets

(51) Int. Cl.

| | |
|---|---|
| *G06N 20/00* | (2019.01) |
| *D06H 3/08* | (2006.01) |
| *G01N 21/94* | (2006.01) |
| *G06K 7/14* | (2006.01) |
| *G06K 19/02* | (2006.01) |
| *G06K 19/06* | (2006.01) |
| *D06F 33/32* | (2020.01) |
| *D06F 105/10* | (2020.01) |
| *D06F 105/42* | (2020.01) |
| *D06F 103/06* | (2020.01) |
| *D06F 34/18* | (2020.01) |
| *G06Q 10/00* | (2012.01) |
| *D06F 105/58* | (2020.01) |

(52) U.S. Cl.
CPC ....... *G06K 7/10861* (2013.01); *G06K 7/1417* (2013.01); *G06K 19/027* (2013.01); *G06K 19/06037* (2013.01); *G06N 20/00* (2019.01); *D06F 34/18* (2020.02); *D06F 2103/06* (2020.02); *D06F 2105/10* (2020.02); *D06F 2105/42* (2020.02); *D06F 2105/58* (2020.02); *G06K 19/06159* (2013.01); *G06Q 10/20* (2013.01)

(58) Field of Classification Search
USPC ....... 8/137; 235/455, 462.06, 462.17, 462.25
See application file for complete search history.

(56) References Cited

U.S. PATENT DOCUMENTS

| | | |
|---|---|---|
| 6,777,684 B1* | 8/2004 | Volkov ............... G01N 21/3581 |
| | | 343/915 |
| 6,784,997 B2 | 8/2004 | Lorenz et al. |
| 2003/0019253 A1 | 1/2003 | Lorenz et al. |
| 2012/0139540 A1* | 6/2012 | Flood ...................... D06F 39/00 |
| | | 324/309 |
| 2014/0247442 A1* | 9/2014 | Johnson ................ G01J 3/2803 |
| | | 356/402 |
| 2015/0062584 A1* | 3/2015 | Hennebelle ....... H01L 27/14601 |
| | | 356/402 |
| 2016/0140870 A1 | 5/2016 | Connor |
| 2016/0247079 A1* | 8/2016 | Mewes .................. G06N 5/048 |
| 2017/0090068 A1* | 3/2017 | Xiang .................... A01B 76/00 |
| 2017/0122889 A1* | 5/2017 | Weindorf ............... G01N 33/24 |
| 2018/0066389 A1 | 3/2018 | Wu et al. |

FOREIGN PATENT DOCUMENTS

| | | |
|---|---|---|
| DE | 20105840 U1 | 8/2002 |
| DE | 102011087274 A1 | 5/2013 |
| DE | 102013210996 A1 | 12/2014 |
| DE | 102016211328 A1 | 12/2017 |
| EP | 1242665 B1 | 3/2004 |
| WO | 0146509 A1 | 6/2001 |
| WO | 2004053220 A1 | 6/2004 |
| WO | 2016126470 A1 | 8/2016 |

OTHER PUBLICATIONS

Schuler et al.: "Preliminary Observations on the Ability of Hyperspectral Imaging to Provide Detection and Visualization of Bloodstain Patters on Black Fabrics", Journal of the Forensic Sciences, vol. 57, No. 6, Nov. 2012, p. 1562-1569. Doi: 10.111/j.1556-4029.2012. 02171.x.

* cited by examiner

METHOD AND DEVICE FOR ASCERTAINING A TREATMENT PARAMETER OF A TEXTILE USING AN IMPURITY COMPOSITION AND A TEXTILE PROPERTY

CROSS-REFERENCE TO RELATED APPLICATION

This application is a U.S. National-Stage entry under 35 U.S.C. § 371 based on International Application No. PCT/EP2018/064720, filed Jun. 5, 2018, which was published under PCT Article 21(2), which claims priority to German Application No. 10 2017 212 862.3, filed Jul. 26, 2017, and which claims priority to German Application No. 10 2017 209 859.7, filed Jun. 12, 2017, which are all hereby incorporated in their entirety by reference.

TECHNICAL FIELD

The present disclosure relates to methods and devices with which at least one treatment parameter is determined via a spectral image resulting from a soiling on a textile and via at least one property of at least one part of a textile, in particular at least one treatment parameter for a cleaning of the textile.

BACKGROUND

Soilings on a textile such as garments, curtains or bedding are often difficult to identify. Soilings can not only affect the aesthetics of the textiles, but also represent a hygienic problem for the user of the textile.

Although many soilings are easy to detect by eye, it is often unclear to the user of the textile what the composition or origin of the soiling is. Soilings having different compositions can have a very similar appearance to the eye, for example, blood stains and tomato stains, in particular after a certain period of time, can no longer be distinguished by the eye. In addition, soilings having similar compositions may, for example, look different on textiles made of different materials.

Thus, it is desirable for the user to obtain an indication of the composition of the soiling in order to obtain a recommendation for a treatment of the textile, for example, to remove the soiling by a cleaning process. Such cleaning processes can be considerably facilitated or even made possible by indications of the composition of the soiling.

However, the nature of the optimal treatment of a textile also further depends on the properties of the textile, for example, the nature of the materials in the textile, the color and the form of the fabric of the textile. Treatment processes of the textile are therefore usually selected by the user, irrespective of the soiling, on the basis of textile care symbols or the specifications of the structure on a label affixed to the textile.

However, the corresponding recommendations for the treatment of the textile resulting from the property of the textile often fail to meet the aforementioned requirements for a specific treatment of the respective composition of the soiling. In the end, the user often relies on the recommendation for a treatment based on the textile care symbols, wherein the treatment of the soiling is insufficient. Conversely, if the textile is treated based on an identification of the soiling, damaging treatment parameters can be used for the structure of the textile.

BRIEF SUMMARY

This disclosure provides a method performed by one or more devices, comprising:
 obtaining a first intensity information item of a spectral image resulting from soiling of a textile;
 obtaining a second intensity information item of a spectral image of at least one property of at least one part of the textile;
 determining at least one treatment parameter, wherein the determination of the treatment parameter takes place both
 dependent on the composition of the soiling from the first intensity information item and
 dependent on the at least one property of the at least one part of the textile from the second intensity information item; and
 outputting or triggering an outputting of the at least one treatment parameter.

This disclosure also provides a device comprising at least one processor and at least one memory having computer program code, wherein the at least one memory and the computer program code are configured with the at least one processor to execute and/or to control the aforementioned method.

This disclosure further provides a computer program comprising program instructions that cause a processor to execute and/or control the aforementioned method when the computer program is run on the processor.

BRIEF DESCRIPTION OF THE DRAWINGS

The present disclosure will hereinafter be described in conjunction with the following drawing figures, wherein like numerals denote like elements.

DETAILED DESCRIPTION

Figure 1:
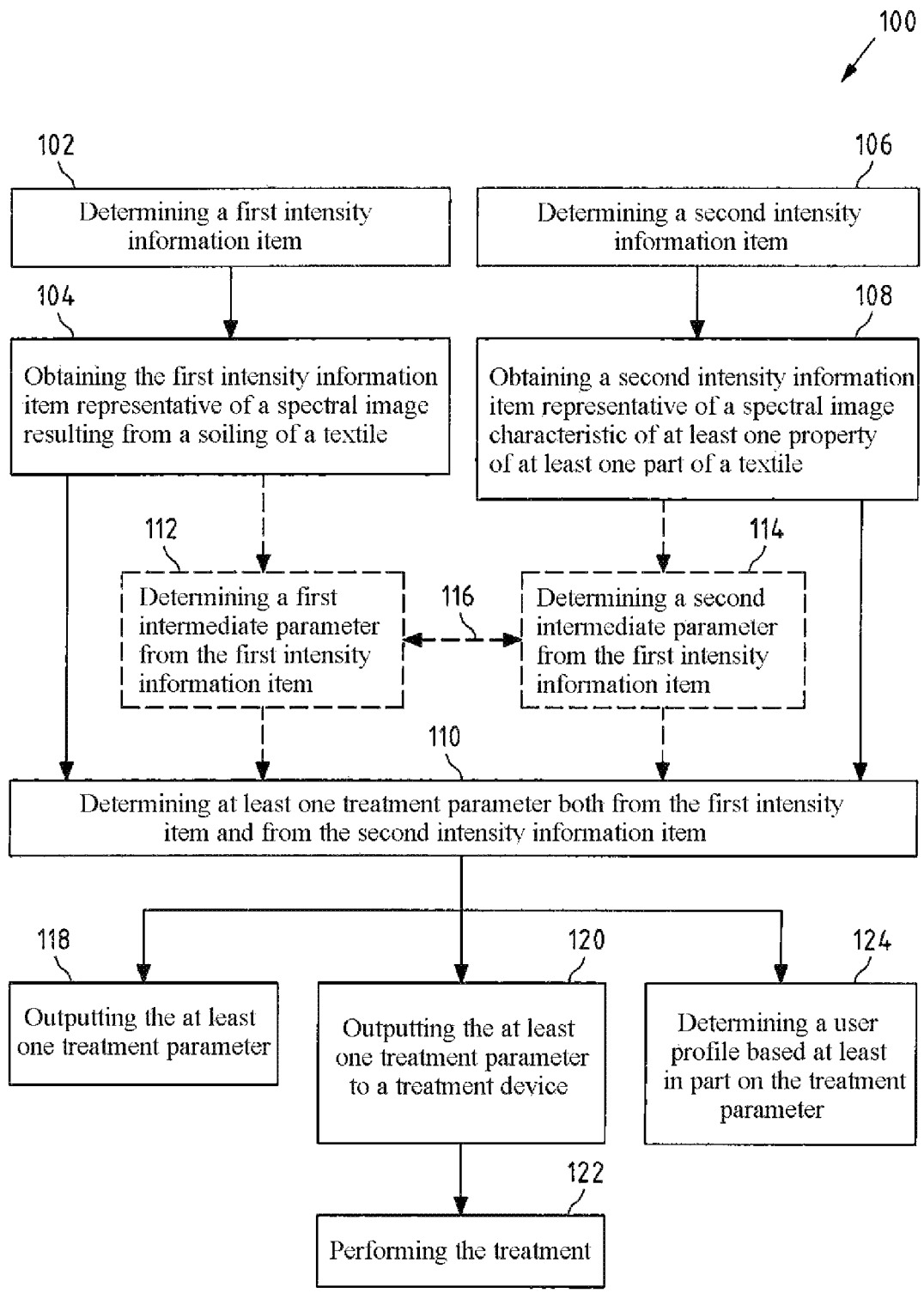
FIG. 1 is a flowchart of an embodiment of a method.

The following detailed description is merely exemplary in nature and is not intended to limit the disclosure or the application and uses of the subject matter as described herein. Furthermore, there is no intention to be bound by any theory presented in the preceding background or the following detailed description.

It is an object of the present disclosure to at least partially reduce or avoid the problems described, that is, to further improve the recommendation regarding an optimal treatment of textiles having soilings. In particular, the proposed methods and devices should allow a more effective and thorough treatment of the soiling on the textiles while protecting the textiles at the same time.

According to a first aspect of the present disclosure, a method is described, performed by one or more devices, the method comprising: obtaining a first intensity information item representative of a spectral image resulting from soiling of a textile; obtaining a second intensity information item representative of a spectral image characteristic of at least one property of at least one part of the textile; determining at least one treatment parameter, wherein the determination of the treatment parameter takes place both dependent on the composition of the soiling from the first intensity information item and dependent on the at least one property of the at least one part of the textile from the second intensity information item; and outputting or triggering an outputting of the at least one treatment parameter.

"At least one" as used herein means 1 or more, that is, 1, 2, 3, 4, 5, 6, 7, 8, 9 or more. This applies to all aspects and embodiments described herein.

According to a second aspect, a device is described which is configured as or comprises corresponding features for performing and/or controlling a method according to the first aspect. Devices of the method according to the first aspect are or comprise in particular one or more devices according to the second aspect.

A spectral image results from the soiling through reflection and emission of radiation, for example, electromagnetic radiation. The resulting spectral image, which comprises the intensity and energy distribution of the resulting radiation, is directly affected by the composition of the soiling. The composition of the soiling of the textile can be understood as meaning the chemical composition and thus the type of soiling, the degree of soiling or the amount of soiling and/or the spatial distribution of the soiling, for example, the form of the soiling.

A soiling is understood as meaning in particular an accumulation of foreign matter on a material of a textile or a discoloration of the surface of the textile, in particular in the form of a stain, dirt or imperfections. For example, particles such as dust, traces of liquids, dyes or greasy residues are located on the surface. Furthermore, unfixed textile dyes can also have been incorporated in the material of the textile, wherein the unfixed textile dyes are able to dissolve from the material, for example, in a cleaning process such as washing. A soiling can also be understood as meaning such dissolved textile constituents as textile dyes.

In particular, garments, curtains or bedding are understood to be textiles. Garments and bedding include, for example, shirts, T-shirts, dresses, jackets, sweaters, pants, blankets, slips, and covers. The textiles can comprise various materials, for example, natural fibers, chemical fibers or other materials such as leather.

The first intensity information item obtained according to the first aspect is representative of a spectral image resulting from a soiling of a textile. In this case, the obtained first intensity information item need only be representative of at least one part of the spectral image. In particular, the first intensity information item contains at least one value representative of the intensity of the spectral image within an energy range. For example, a monochrome or intensity integrated over an energy range can be detected using a value representative of the intensity of the spectral image within an energy range, A spectral intensity distribution with energy resolution can be obtained using a plurality of values, each representative of the intensity in different energy ranges. Such an intensity information item is accessible to a physical measurement.

Since the composition of the soiling affects the resulting spectral image, the obtained first intensity information item is also co-determined by the composition of the soiling.

The second intensity information item is representative of a spectral image characteristic of at least one property of at least one part of the textile, wherein a property of at least one part of the textile is understood as meaning in particular the structure of the textile, material structure, material type, material distribution, a finishing of the material of the textile, color and/or color distribution of the textile, material wear of the textile, type and/or form of a fabric, a knit fabric, nonwoven fabric or fibrous web, or a combination thereof. Furthermore, the structure of the textile can be determined by the presence and/or the type of closure element, of coating material and/or of applications in, at and/or on the textile. The various possible properties of the textile make certain demands on an optimal treatment of the textile.

It has been found that by determining at least one treatment parameter, wherein the determination of both the composition of the soiling and at least one property of at least one part of the textile is made dependent on the fact that the first intensity information item and the second intensity information item both affect the determination of the at least one treatment parameter, the recommendation regarding optimal treatment can be decisively improved. The determination of the at least one treatment parameter in this case takes place both based on the requirements determined by the soiling, for example, with regard to a removal of the soiling as far as possible by the treatment, and based on the requirements of the property of the textile, for example, the gentlest possible treatment of the textile. In particular, the determination of the at least one treatment parameter comprises a correlation of first and second intensity information item and/or intermediate variables, which are determined from the first and/or second intensity information item.

In this case, a treatment result which goes beyond a mere aggregation of the two requirements can be achieved. Rather, with the method according to the first aspect, a determination can be made of the at least one treatment parameter, which represents an advantageous compromise of the requirements of the composition of the soiling and the requirements of the property of the textile. In this case, the determination of the at least one treatment parameter can be supplemented on the basis of the composition of the soiling and the property in particular. For example, among various alternatives for treatment parameters, it is possible to select those which are both compatible with the requirements of the composition of the soiling and the property, and being altogether advantageous. Furthermore, in particular, the accuracy of the determination of the at least one treatment parameter can be increased. Finally, the method according to the first aspect makes it possible to provide at least one treatment parameter which is advantageous for the specific combination of soiling and textile.

By outputting or triggering the outputting of the at least one treatment parameter, it is thus possible for the user to be provided with an information item for the recommended treatment of the textile having the soiling. For example, information items about the chemical composition or about the occurrence of individual elements or compounds in the soiling can be made available to the user. For example, it can be determined whether the soiling contains levels of certain organic or inorganic components, such as dyes or lipids, and, optionally, the source of the soiling. These information items are set in particular in connection with information items about the property of the textile. For example, the at least one treatment parameter can provide the user information items about a possible hygienic objectivity of the soiling, in particular with regard to the present property, for example, the material type and/or color of the textile. For example, certain treatments of the textile which would be detrimental in particular to the structure of the textile can be excluded.

The method according to the first aspect or the device according to the second aspect thus makes it possible, in particular, to make it easier for the user to identify the composition or the origin of the soiling and to provide corresponding treatment parameters. If, for example, a soiling can not be identified by the eye, at least one treatment parameter, which is dependent on the composition of the soiling, can be determined via the method or the device. At the same time, the treatment parameter is also dependent on the property of the textile. Overall, a treatment of the soiled textile can be recommended by which collateral damage such as shrinkage or loss of shape of the textile, an unwanted bleaching or decolorization, the promotion of pillings, damage to coatings and/or discoloration are avoided. On the other hand, if, as in the prior art, the treatment is adjusted either merely to the soiling or merely to the property of the textile, such collateral damage and inadequate treatment can arise.

It is also conceivable that substances dissolved from the material of the textile, for example, unfixed textile dyes, are detected as a soiling via the at least one treatment parameter. In one embodiment of the method according to the first aspect, the first intensity information item is at least partially representative of a spectral image resulting from an illuminated surface of the soiling on a textile. If the soiling is illuminated, such as with radiation such as electromagnetic radiation, a spectral image results from reflection and emission to and from the surface of the soiling. The illumination of the soiling can be effected in particular by employing the radiation spectrum of the sun comprising natural light or by employing an artificial radiation spectrum, for example, the spectrum of a thermal or non-thermal radiator such as incandescent lamps, fluorescent tubes or LEDs. Also conceivable is an excitation via monochrome radiation.

In a further embodiment of the method according to the first aspect, the second intensity information item is representative of a spectral image resulting from an illuminated surface of at least one part of the structure of the textile. The illumination can take place as described above for the first intensity information item.

Alternatively or cumulatively, the second intensity information item can be representative of a spectral image resulting from an illuminated surface of a marking on the textile. A marking is understood in particular as meaning a label which is attached in particular to the textile. The marking can also be arranged partially or entirely on the structure of the textile itself. The marking is in particular indicative of parameters characteristic of at least one property of the textile, in particular the structure of the textile, the material structure, material type, material distribution, a finishing of the material of the textile, color and/or color distribution of the textile, material wear of the textile, type and/or form of a fabric, a knit fabric, a non-woven fabric or fibrous web, or a combination thereof. The marking is in particular indicative of parameters characteristic of a treatment parameter. For example, such parameters can be indicated by a code, for example, a two-dimensional or three-dimensional bar code in the marking. In one embodiment, such a parameter is indicated by an inscription of the label and/or the structure of the textile. Thus, the second intensity information item can be provided on the basis of an identifier which is characteristic, in particular, of the composition of the structure of the textile, for example, an identifier according to the textile identification law (TKG), and/or a care label which specifies preferred treatments of the textile. Care symbols can be provided, in particular standardized care symbols, for example, care symbols according to the Ginetex standard. In particular, codes, for example, two-dimensional or three-dimensional bar codes, are taken from an inscription.

In particular, with a second intensity information item representative of the spectral image of a marking on the textile, the determination of the at least one treatment parameter can comprise one or more text recognition actions, for example, in an optical character recognition (OCR) method and/or an intelligent character recognition (ICR) method. In particular, the second intensity information item is processed via one or more filters, for example, for adjusting brightness, contrast and/or color depth. The second intensity information item can be subjected to a classification for text recognition, in particular in combination with a context analysis. This is particularly useful for markings on textiles, since the markings can already be affected by the age of the textiles and, for example, are already faded or incomplete. An incomplete or only partly legible inscription can be supplemented with the help of the context analysis. For example, common inscriptions on labels on textiles can be recognized with text recognition, so that the textiles do not have to have any special markings or labels.

In a further embodiment of the method according to the first aspect, the determination of the at least one treatment parameter comprises a comparison with comparison values. Corresponding comparison values can be stored in a database. Comparison values can be used both to derive the at least one treatment parameter and/or intermediate variables from the first and/or second intensity information item and also to derive intermediate variables for further determination of the treatment parameter from the first and/or second intensity information item. The comparison with comparison values can comprise a classification, wherein the at least one treatment parameter is obtained or affected by a result of the classification. For example, a classification can be based on a comparison of the first and second intensity information item with a database of already known intensity information items.

The comparison values or a database provided for this purpose can in particular contain intensity information items of typical soilings occurring in the fields of application of the textiles or properties of the textile. For example, in the household sector, intensity information items of typical soilings can be accessed, such as various food residues, traces of beverages, grass or colors. Comparative values of, for example, material structure, material type, material distribution, a finishing of the material of the textile, color and/or color distribution of the textile, material wear of the textile, type and/or shape of a fabric can be stored for the property of the textile. Comparative values can likewise be used for specific combinations of compositions of soilings and properties of textiles. The comparison values can comprise at least one value for the intensity in a certain energy range of a spectral image and/or continuous values for at least one energy interval of a spectral image. Furthermore, at least one treatment parameter can be assigned to the corresponding comparison values.

The determination of the treatment parameter can comprise one or more steps of a feature extraction and/or a feature matching. For example, methods are used which correspond to those of the evaluation of biometric photos.

Intermediate variables can be determined and evaluated for the determination of the at least one treatment parameter. In one embodiment of the method according to the first aspect, at least one first intermediate parameter is determined dependent on the first intensity information item, and a second intermediate parameter is determined dependent on the second intensity information item; and the determination of the at least one treatment parameter comprises a comparison of the first intermediate parameter with the second intermediate parameter. For example, at least one treatment parameter will be determined from the first and second intensity information items as first and second intermediate parameters. Thus, at least one treatment parameter containing a recommendation regarding a treatment based on the composition of the soiling and at least one treatment parameter containing a recommendation of a treatment based on the property of the textile are provided. These various treatment parameters are compared, in particular, to find a compromise between the various requirements of soiling and property, or to provide an optimal solution for the treatment of the specific combination of soiling and textile.

A comparison of the first and second intermediate parameters is carried out in particular in that, with regard to the composition of the soiling, a set of possible treatment parameters and, with regard to the property of the textile, a set of possible treatment parameters, is established in each case. These first and second intermediate parameters are then selected for the greatest possible match. For example, matching and/or intermediate parameters which are similar within predetermined limit values are identified and, in the result, output as treatment parameters. For example, similar intermediate parameters are identified and, in particular, an averaging or weighting is performed. In particular, based on the first and second intensity information item, in each case a first and second set of treatment parameters are determined comprising ranges, for example, temperature ranges, concentration ranges (for cleaning agents, for example) and/or time ranges. The ranges of the first and second set of treatment parameters are selected for greatest possible overlap. Thus, according to a principle of "least common multiples", the matching characteristics for the treatment of soiling and property can be found and optimal treatment parameters for both criteria, property of the textile and composition of the soiling, can be determined.

Furthermore, the determination of the at least one treatment parameter can also comprise exclusion criteria. For example, it can be predetermined that certain compositions of soilings and certain properties of textiles may not be treated with certain treatment parameters. Such exclusion criteria serve, for example, to avoid damage to the textile and can be included, for example, in the comparison of intermediate variables.

In one embodiment of the method according to the first aspect, the determination of the at least one treatment parameter comprises the determination of a composition information item of the soiling from the first intensity information item. In particular, the composition information item can be one or more values representative of the chemical composition of the soiling, the degree of soiling and/or the spatial distribution of the soiling. For example, the composition information item comprises at least one value for the occurrence and/or the concentration of a chemical element or a chemical compound, the amount of the soiling or the areal extent of the soiling. The composition information item can be determined by a comparison with comparison values and/or a classification of the first intensity information item.

The determination of the at least one treatment parameter can comprise the determination of a structure information item of the textile from the second intensity information item. The structure information item can, in particular, be one or more values which are representative of the type and/or shape of a woven fabric, a knit fabric or a non-woven fabric or fibrous web. The corresponding structure information item can in particular be characteristic of the type of interweaving of fibers, as produced, for example, via weaving, knitting, or characteristic of a nonwoven textile. In this case, a splice pattern or a thread cross-over pattern and a thread weave can be comprised by the structure information item. Yarn density, fiber thickness, fiber length, fiber fineness and/or fiber orientation can be detected in particular in the structure information item. The material structure of the textile has a direct effect on the requirements for the treatment of the textile, for example, a nonwoven fabric can have different cleaning treatment requirements than a knitted or woven structure.

The second intensity information item can also be characteristic of a finishing of the material of the textile. For example, the material of the textile has been refined during the production, in particular chemically treated, wherein a modification of the material structure can take place. Such a finishing can be detected via the second intensity information item and included in the determination of the at least one treatment parameter, in particular with a determination of a structure information item. It is also conceivable that an information item is provided for the finishing, for example, via an indication by the user and/or via an intensity information item of a marking on the textile, and this information item is included in the evaluation of the second intensity information item for the finishing.

The type of material is understood in particular as meaning the composition of at least one part of the material of the textile. For example, the structure information item is indicative of natural fibers, chemical fibers or natural materials such as wool or leather in the textile. The material type also has a significant effect on an optimal treatment of the textile, such as a cleaning treatment.

Using the material distribution of the textile, it can be detected, for example, whether the textile has a mixed fabric of different fiber types or fiber materials and/or whether partial regions of the textile are made of a different material. In this case, the ratio of the different materials to each other, for example, a density ratio, mass ratio or area ratio, can be detected. Furthermore, the structure information item can contain the type and number of connection points, for example, seams, welds or adhesive points.

Using the structure information item indicative of the material wear, it can be recorded in particular whether there are pillings, cracks, holes, wear or other structural damage to the textile. In particular, for pillings, which arise by a loosening of fibers from the textile composite and occur in the form of knots on the textile surface, the type, shape, size or height, number and/or distribution of the material wear can be detected. By determining at least one treatment parameter based on the material wear, it is possible to adapt the treatment of the textile according to the material wear in order to curb further increased material wear or, for example, also to remove the pillings in order to restore the appearance of the textile.

In a further embodiment of the method according to the first aspect, the structure information item is indicative of the presence and/or type of closure element, of coating material and/or of applications in, at and/or on the textile.

Closure elements on the textile are understood in particular as meaning zippers, hook-and-loop fasteners, buttons or similar arrangements, which are in particular configured to create a connection of parts of the textile via a positive connection and which can be designed detachable.

The textile can have one or more coating materials, in particular the fibers are coated or a coating is applied to the structure of the material of the textile, for example, on the fabric. The coating can be, for example, a functional layer such as a protective layer or sealing layer or can alter the look or feel of the textile.

Textiles, in particular garments, can further have applications such as imprints, sequins, lace, patches or the like, which can also be exemplified with the structure information item. Likewise, functional textiles can have functional elements as applications or electronic elements can be arranged in the textile or on the surface of the textile.

If structure information item is indicative of such closure elements, coatings and/or applications on the textile, care can also be taken to protect the corresponding elements during treatment. On the one hand, a wear of such closure elements, coatings and/or applications can be reduced during a treatment and on the other hand, for example, a detachment of coatings or applications can be avoided.

Furthermore, the structure information item can be indicative of one or more colors of the textile. For example, the structure information item indicates an average color, a color distribution and/or a measure of the homogeneity of the color distribution. For example, the structure information item contains values in a color space such as an RGB color space and/or a L*a*b* color space. In particular, a color reference indicative of the color of the textile is used to determine the structure information item, for example, a color chart, which is recorded with the second intensity information item. The determination of the structure information item indicative of the color of the textile can comprise a white balance, for example, based on a reference such as a gray card, which is recorded with the second intensity information item. The determination of the structure information item indicative of the color of the textile can in particular comprise aspects of the method described in WO2016/126470 A1, wherein the subject matter of WO2016/126470 A1 is included in the disclosure of the present application.

In particular, the first and/or the second intensity information item comprises one or more parameters of a size information item, for example, a spatial extent or the volume of the soiling and/or the property of the textile. In particular, it is also possible to determine the dimensioning of the structure of the textile, for example, the fiber thickness, fiber density, mesh size, stitch density, the size of abrasions such as, for example, pillings. In particular, the dimensioning is determined in conjunction with a reference.

In particular, the first and/or the second intensity information item comprises a measure of the roughness of the surface, for example, in conjunction with a three-dimensional spatial resolution. The measure of the roughness can comprise, for example, the average roughness $R_A$, the average roughness depth $R_Z$ and/or the maximum roughness depth $R_{max}$. The composition of the soiling and/or the property of the textile can be further determined via the roughness. In particular, the roughness can also be an indication of the degree of wear of the textile and the age of the soiling.

In particular, the first and/or the second intensity information item contains a measure of the gloss of the property of the textile and/or the soiling, which is exemplified, for example, via the reflection of the surface of the textile and/or the soiling, in particular via the diffuse reflection of the surface. For example, the first and/or the second intensity information item comprises an angle dependence of the reflectivity of the respective surface.

In one embodiment of the method according to the first aspect, the determination of the composition information item is based in part on the structure information item and/or the determination of the structure information item is based in part on the composition information item. For example, soilings having the same composition can give a different appearance to textiles having different properties. Due to the fact that the determination of the composition information item is based in part on the structure information item, a corresponding influencing of the first intensity information item by the property of the textile can be taken into account in the determination. Consequently, the first intensity information item can be evaluated more accurately and the composition information item can be determined more accurately, which leads overall to a better recommendation of the treatment parameter. Likewise, the determination of the structure information item from the second intensity information item can be performed more accurately by including the composition information item. This decisively improves the determination of the treatment parameters with respect to the prior art, which takes into account either only the composition of the soiling or only the property of the textile, since interactions between the composition and the property are also taken into account in the evaluation of the intensity distributions.

Usually, the soiling should be removed by a cleaning process again. In one embodiment of the method according to the first aspect, the at least one treatment parameter comprises at least one parameter of a cleaning strategy of the textile. The user can thus be given a recommendation about an optimum cleaning process with regard to the soiling present.

In particular, when a user of the textile can not identify the property of the textile and the soiling with the eye and it is therefore unclear how to remove the soiling again, the method according to the first aspect or the device according to the second aspect can provide a recommendation about an optimal cleaning strategy. For example, it can be unclear to the user whether a soiling contains lipids or certain dyes that can not be reliably removed via commonly used cleaning strategies. A recommendation can be made about a cleaning strategy adapted to the individual combination of soiling and textile via the cleaning strategy determined as part of the method, dependent on the composition of the soiling and the property of the textile, for example, with the identification of corresponding ingredients of the soiling and with regard to the property of the textile.

It is also conceivable that substances dissolved from the material of the textile, for example, unfixed textile dyes, are determined as a soiling. This happens in particular during the performance of a cleaning strategy, so that the user is given a conclusion on the effectiveness of the cleaning strategy. For example, the user can recognize whether an excessive amount of textile dyes dissolves from the material of the textile, whereby the user receives an incentive to change the cleaning strategy and, if necessary, to make it more gentle with regard to the textile dye. Likewise, a decolorization of a textile can be intended and a conclusion about the degree of decolorization can be drawn by a cleaning strategy.

In particular, the at least one parameter of the cleaning strategy represents a cleaning agent type, a cleaning agent composition, an amount of cleaning agent, a cleaning temperature, a type of cleaning device, settings of a cleaning device, or combinations thereof.

Cleaning agents are used, for example, in the household for the cleaning of different objects. For example, a cleaning agent, for example, a washing agent, for washing machines is used for cleaning textiles. However, a cleaning agent should likewise also be understood as meaning cleaning auxiliaries or cleaning additives, for example, a bleaching additive, a fabric softener or laundry starch. A cleaning agent can also be a liquid, a dispersed system, for example, a gel or foam, or a solid, in particular, a tab, powder or granules.

A cleaning agent can, for example, have one or more components from the group of components comprising surfactants, alkalis, builders, grayness inhibitors, optical brighteners, enzymes, bleach, soil release polymers, fillers, plasticizers, perfumes, dyes, conditioners, acids, starch, isomalt, sugar, cellulose, cellulose derivatives, carboxymethylcellulose, polyetherimide, silicone derivatives and/or polymethylimines.

A cleaning agent can further comprise one or more other ingredients. These ingredients include, but are not limited to, the group including bleach activators, chelants, builders, electrolytes, nonaqueous solvents, pH adjusters, perfume carriers, fluorescers, hydrotropes, silicone oils, bentonites, anti redeposition agents, anti-wear agents, anti-wrinkle agents, dye transfer inhibitors, anti-microbial active substances, germicides, fungicides, antioxidants, preservatives, corrosion inhibitors, anti-static agents, bittering agents, ironing auxiliaries, repellents or impregnating agents, swelling or slipping agents and/or UV absorbers.

The at least one parameter of the cleaning strategy can represent the cleaning agent type and thus be indicative of the composition of the cleaning agent. For example, if some level of dye is contained in the composition of the soiling, the use of certain bleaching additives can be recommended to the user. For example, if certain levels of lipids are present in the composition of the soiling, the use of specific surfactants and/or lipases can be included in the recommended cleaning strategy.

The at least one parameter can represent the amount of cleaning agent and, in particular, indicate an absolute amount of the cleaning agent. Likewise, a relative amount of the cleaning agent can be displayed by employing the at least one parameter, for example, based on the mass of the textiles to be cleaned or a bath ratio or an amount of cleaning agent based on a water volume to be used for cleaning. A cleaning agent type and/or an amount of cleaning agent can thus be determined which ensures an optimum removal of the soiling via the first intensity information item dependent on the composition of the soiling and the second intensity information item dependent of the property of the textile.

In particular, a cleaning agent composition can be based on a base composition which is supplemented and/or modified via individual components. One or more predefined cleaning agent modules can be provided, wherein the cleaning agent composition can be provided by a selection of one or more cleaning agent modules.

An optimal temperature for removing the soiling can be indicated for the certain composition of the soiling using a parameter representative of the cleaning temperature, in particular in combination with a cleaning agent type. On the one hand, the cleaning temperature can be high enough to ensure that the soiling is removed as completely as possible and, on the other hand, kept low in terms of energy consumption and protection of the textile.

A cleaning device is understood in particular as meaning a washing machine, in particular automatic household washing machine. In this case, a parameter of the cleaning strategy can indicate a certain type of such a cleaning device. It is also conceivable that the parameter at least partially simulates cleaning strategies to be performed manually, such as a hand washing. Also, the at least one parameter can comprise settings of a cleaning device, for example, a program of an automatic household washing machine or a sequence of such programs.

A waxing machine can be present in various forms. A distinction is made between top loaders, in which the hatch is located at the top, and front loaders, in which a porthole serves as a hatch on the front. The advantage of the top loader is that the sealing of the door can be made simpler and the drum can be supported on two sides by roller bearings, a top loader can also be set up in very confined spaces where there is not enough space to open a front door. A front loader, however, offers space on the top, for example, for a tumble dryer or for a work surface and is therefore sometimes installed instead of a floor unit in a kitchenette.

The American top loaders always have a rotating drum and mixing elements (agitator or discs), wherein the mixing elements can move with or against the drum rotation direction. The machines can include an alkali recirculation and spray devices for the alkali. Basically, a distinction is made between deep fill and HE top loader. Deep Fill top loaders work with given water levels, so they have no load detection. HE machines usually have a load detection and then control the amounts of water. In general, the machines have no built-in heating, but are connected to hot water.

The at least one treatment parameter can comprise a recommendation regarding a pretreatment of the textile. Such a pretreatment comprises, for example, a manual or automatic application of a cleaning agent to the soiling, in particular with a predetermined contact time, the duration of which can also be detected as a treatment parameter. Subsequently, the textile can be cleaned in a cleaning device, for example, an automatic household washing machine. For example, at least one treatment parameter indicates a pre-cleaning or pre-washing, in particular a soaking of the textile in a certain solution or a pre-cleaning program of a cleaning device. Various pretreatment agents can be provided for manual or automatic application, for example, the application of a stain remover or bleach is indicated. Furthermore, an arrangement of the textile can be given in particular in that the textile should be turned "on the left" before the actual treatment or arranged in another device, for example, in a laundry bag. Furthermore, the pretreatment can also comprise closing the closure element, for example, the user can receive an indication of closure of a zipper for subsequent treatment.

It can be provided, for example, that the textile is dyed or subjected to a gentle treatment as a treatment of the textile. For example, based on the intensity information item, a coloration recommendation can be determined, wherein the textile receives a refreshing and/or a change in the coloring in accordance with the at least one treatment parameter by color.

The recommendation of the treatment parameter for a final treatment can relate, for example, to a drying or smoothing, in particular an ironing of the textile. The at least one treatment parameter can specify, among other things, the treatment temperature, treatment length and/or a treatment mode. A final treatment takes place, for example, after a cleaning treatment. It is also possible to perform final treatments such as drying or smoothing independently of a cleaning treatment.

The at least one treatment parameter determined by the method according to the first aspect can be made available to the user. The at least one treatment parameter can be output to the user on a display or a corresponding output can be triggered, for example, an output on a screen, in particular in text form, and/or an acoustic output, such as a voice message. The user can then perform the treatment. Alternatively or additionally, in one embodiment of the method, the at least one treatment parameter can be output to a treatment device for this purpose. For example, the at least one treatment parameter can represent at least one parameter of a cleaning strategy which is output to the cleaning device, so that the cleaning device, for example, adopts the corresponding cleaning strategy as default and the user merely has to start the cleaning device. It is also conceivable that the cleaning device automatically performs the cleaning strategy with the output. For example, the cleaning device can have a dosing device for cleaning agent to automatically provide the cleaning agent type and amount of cleaning agent according to the recommended cleaning strategy. The user friendliness of the method is thereby improved as a result.

In particular, the method further comprises performing a treatment of the textile via a treatment device based on the at least one treatment parameter, for example, performing a recommended cleaning strategy via a cleaning device.

In this case, the first intensity information item and/or the second intensity information item can be obtained before, during and/or after performance of the treatment. With receipt before the treatment, for example, the user can be given a recommendation about the treatment strategy to be used before a treatment to be performed. When obtaining the intensity information item during the treatment, the treatment can be performed dynamically, for example, that is, a treatment device can adapt to the just determined at least one treatment parameter during the treatment, in particular in which the treatment parameter is determined continuously. For example, during the washing program, a washing machine adjusts the temperature and/or the amount of cleaning agent according to the determined treatment parameter. In particular, the second intensity information item of textile components dissolved from the textile such as textile dyes can also be obtained here. By obtaining the first and/or second intensity information item after a treatment, for example, the result or the effectiveness of a treatment can be recorded and checked.

In one embodiment of the method, the method further comprises determining the first intensity information item and/or second intensity information item, in particular via at least one optical sensor. In this case, an optical sensor is understood as meaning sensors which can determine an intensity of incident radiation, in particular electromagnetic radiation in the visible range and optionally beyond. In particular, the optical sensor is configured to provide an energy resolution and/or spatial resolution of the intensity information item. The optical sensor can comprise an image sensor, in particular a digital image sensor. In particular, at least one semiconductor element, diode, CCD element, for example, a Bayer sensor, or CMOS element, for example, a sensor of the type Foveon X3, can be used to determine the incident radiation. The optical sensor can contain optical filters and in particular a spectrometer. Also conceivable is the use of monochrome sensors without color resolution. Likewise, sensors can be used which are limited to certain wavelength ranges. For example, the optical sensor can be based on at least one photodiode and/or at least one LED element. Individual elements or arrays of elements, such as photodiodes or photosensitive components such as LEDs can be used. It can be advantageous to optimize the size of the individual sensor elements, for example, the individual photodiodes, in terms of dynamics, resolution and/or sensitivity.

In this case, in particular, an optical sensor or an optical sensor arrangement can be provided which determines both the first intensity information item and the second intensity information item. The method is accordingly simplified since only one structural element is needed to provide the intensity information item. The determination of the first intensity information item and the second intensity information item can take place simultaneously and/or successively.

Furthermore, a radiation source, for example, a light source such as an illumination element and/or a flash can be provided, which are in particular adapted to the optical sensor and serve to illuminate the surface of the soiling. Such a radiation source can be combined with the optical sensor in a structural unit. If the method comprises exposing the soiling and/or the textile to radiation, for example, illumination, a determination of the intensity information item can be based on a defined excitation. For example, the soiling and/or the textile is exposed to or illuminated by radiation via a light source, wherein the radiation used has a certain intensity and/or certain spectral distribution. Such an illumination ensures that sufficient illumination is ensured regardless of the external conditions. Determining the intensity information item(s) can thereby be made possible also in poor external conditions, such as low daylight in a dark room, or in any case the quality of determination can be improved.

Illumination is understood as meaning that light is generated with the aid of an artificial light source, so that in particular a (better) visualization of the soiling and/or the textile can take place. The illumination is effected in particular by radiation which lies at least partially in the visible range of the electromagnetic spectrum, for example, with a radiation whose wavelength covers at least one part of the wavelength range from about 380 nm to about 780 nm.

For example, LEDs are used for illumination. LEDs can cover a well-defined frequency range. LEDs having different color temperatures can be used individually or in combination, for example, with red, green, blue and/or white LEDs.

The wavelength range can be further adapted specifically to the determination of the intensity information item. For example, an optical sensor comprising a CMOS element having a sensitivity maximum in the near infrared region (NIR) is used. In this case, an illumination with radiation in the NIR range is advantageous. The NIR range is understood as meaning a wavelength range of the electromagnetic spectrum of at least about 750 nm, in particular up to a maximum of about 2000 nm, in particular of at least about 800 nm to a maximum of about 1400 nm.

The duration of the excitation can be varied. In particular, the time duration can be relatively short, that is, below one second using, for example, a flash. The duration of the excitation can be further less than about 0.1 seconds, in particular less than about 0.01 seconds. A short excitation or a flash can be used alone or combined with another illumination element. For example, a flash is used in combination with a continuously operating illumination element, wherein flash and illumination elements are combined in a combined illumination unit. It is also possible to temporally modulate the light intensity.

An illumination element and optical sensor can also at least partially use the same elements, which enables significant cost advantages in the manufacture of the device, in particular when using LEDs. When illumination element and optical sensor are given at least partially identical elements, a coordination of excitation and detection at certain wavelength ranges is also facilitated. For example, LEDs can both emit and detect light. The soiling and/or the textile can be placed between an illumination element comprising at least one transmitter LED and an optical sensor comprising at least one receiver LED. If transmitter LED and receiver LED are identical, transmission or attenuation of the radiation by the soiling can be determined in a particularly simple and direct manner Likewise, an arrangement of transmitter LED and receiver LED can be provided in a reflection or emission measurement.

In a further embodiment of the method, the first intensity information item and/or the second intensity information item is representative of a hyperspectral image. An intensity information item representative of a hyperspectral image is understood in particular as meaning that the intensity information item has intensity values in a plurality of channels for different energy intervals as an intensity distribution, wherein at least two of the energy intervals adjoin or overlap each another. In particular, a hyperspectral image of a multispectral image can be delineated in that while a multispectral image also has intensity values in a plurality of channels for different energy intervals, the energy intervals are spaced apart from each other, that is, in a multispectral image, intensities are reflected by individual energies separate from each other. In contrast, in a hyperspectral image, in particular, "adjacent" intensity values are reflected by connecting or overlapping at least two of the energy intervals with each other. A hyperspectral image can thus at least partially reflect a continuous spectrum. An intensity information item representative of a hyperspectral image has, in particular, the advantage that information items which are not visible to the eye and indicative of the composition of the soiling and/or the property of the textile can also be detected.

The intensity information item can in this case comprise values in at least about 20 channels, wherein each channel represents an intensity for one energy interval. If values of the intensity information item are provided in at least about 20 channels, the resolution of the spectral image and thus also the accuracy of the determination of the at least one treatment variable can be improved. In particular, the first intensity information item and/or the second intensity information item comprises at least about 20 channels to about 250 channels, thus achieving a more accurate dependence of the treatment parameter on the composition of the soiling or the property of the textile. Using at least about 20 channels, energy intervals can be achieved in an intensity information item representative of a spectral image, in particular for a hyperspectral image, that represent that which can not be resolved by the human eye, which has only three channels in the visible region.

According to a further embodiment of the method, if the first intensity information item and/or second information item is representative of spectral components of a spectral image, wherein at least one of the spectral components lies outside the visible energy range, the composition of the soiling and/or the property of the textile can be incorporated into the determination of the treatment parameter with increased accuracy. By taking into account non-visible spectral components, it is also possible to identify various compositions of soilings and/or properties of textiles, although these are indistinguishable to the eye.

In one embodiment of the method, the method further comprises: performing a referencing of the determination of the first and/or second intensity information item. For example, determining spectral components of the spectral image, in particular a comparison with a sensitivity spectrum, can take place, for example, based on predetermined settings or by comparison with a reference. The reference can in particular be designed as a card, for example, in the form of a color chart, gray card and/or a size scale, which can be placed on the textile or the soiling. Likewise, a reference can be attached in and/or on a treatment device. For example, a surface in the interior of the treatment device, such as the surface of a cleaning container, is provided with a reference. The reference can also be part of an outer packaging of features for performing a washing, cleaning, care or dyeing process, for example, in the form of an imprint, a removable part of the packaging or as a digital information item, for example, in the form of an electronic label.

In particular, the first and/or second intensity information item is representative of spectral components of a spectral image in the ultraviolet energy range. Likewise, spectral components in the infrared energy range can be taken into account. The first and/or second intensity information item is in particular representative of spectral components of a spectral image from the infrared energy range to the ultraviolet energy range, for example, at least for spectral components of a spectral image having wavelengths from about 1400 nm to about 315 nm, preferably for wavelengths from about 3000 nm to about 280 nm, more preferably for wavelengths of from about 5000 nm to about 200 nm. The first and/or second intensity information item is in particular representative of spectral components of a spectral image in the (near) infrared energy range, for example, for wavelengths from about 700 nm to about 2400 nm, in particular from about 750 nm to about 2000 nm, in particular up to about 1450 nm.

The first and/or second intensity information item can be representative of a single image point of the spectral image. In particular, however, in one embodiment of the method, the first intensity information item and/or second intensity information item is representative of spatially resolved components (respectively) of a spectral image. A spatially resolved intensity pattern comprises the information item about the intensity of the radiation at at least two positions in space. The spatially resolved intensity pattern can, for example, be measured by a movable optical sensor, wherein the position of the optical sensor is varied and an intensity is measured at each position. However, it is preferred to use an optical sensor having a plurality of spatially-spaced sensor elements, for example, pixels, wherein a spatially resolved intensity information item can be obtained via the intensity information item in the various pixels.

Conceivable here is a one-dimensional, for example, linear resolution. In one embodiment of the method, however, a two-dimensional spatial resolution is made. In particular, the spatial resolution is made via a planar arrangement of sensor elements or at least one sensor field, for example, pixels.

In one embodiment of the method or the device, the determination of the first and/or second intensity information item representative of spatially resolved components of a spectral image is made via an integrated camera of a mobile device, in particular via a hyperspectral camera, which is configured to determine an intensity information item representative of a hyperspectral image.

In one embodiment, the optical sensor element or multiple optical sensor elements provides a three-dimensional spatial resolution. The accuracy of the determination of the composition of the soiling and the property of the textile can be further increased using a three-dimensional spatial resolution. It is conceivable to use a plurality of images from different perspectives via the same optical sensor or the same sensor arrangement, in particular with a plurality of optical sensor elements. Likewise, optical elements formed specifically for a three-dimensional resolution, such as attachment lenses or objective lenses can be provided, or a 3D camera can be used. Additional optical elements, for example, attachment lenses or objective lenses, can also be arranged on conventional, essentially two-dimensional optical sensors, for example, digital cameras or cameras integrated into mobile devices. Already existing devices can thus be retrofitted for a three-dimensional resolution. Using the three-dimensional resolution, for example, the textile structure, for example, the form and arrangement of the fabric, the mesh or the nonwoven textile can be determined in more detail and thus a more comprehensive and accurate structure information item can be obtained.

In one especially simple embodiment, at least one used optical sensor element comprises at least one camera-like element and provides an image information item. Accordingly, digital cameras or cameras integrated into mobile devices can be used for the method or serve as at least one device for performing the method. In this case, attachments for a three-dimensional spatial resolution can be used on the camera-like element.

In particular, the first intensity information item and the second intensity information item are determined via the same optical sensor element, for example, the same camera. In particular, the first intensity information item and the second intensity information item are determined simultaneously and/or sequentially via the same optical sensor element. For example, an image information item about both the soiling and the property of the textile is determined via a camera. Depending on this image information item, the first intensity information item and the second intensity information item can then be determined.

In particular, the user can also influence the determination of the first and/or second intensity information items, for example, the user is provided with an image information item on a display and the user can select regions of the image information item which are to be used to determine the first and/or second intensity information item.

In one embodiment, the image information item comprises at least two individual images of the soiling and/or the textile. The individual images can represent a temporal sequence, for example, one or more film sequences, or also a variation of the position and perspective of the camera-like element. The accuracy of the intensity information item(s) can be further increased as a result. In particular, as already described above, a three-dimensional spatial resolution can be achieved via a plurality of individual images.

In a further embodiment of the method according to the first aspect, at least one acoustic sensor element is used to determine the second intensity information item. The device according to the second aspect can accordingly have a structure sensor comprising at least one acoustic sensor element.

In this case, an acoustic sensor element can detect the sound emanating from an excitation of the textile and use it to determine a second intensity information item, with which a non-destructive structure determination becomes possible. In particular, sound waves having different frequencies or frequency ranges are detected with the acoustic sensor element and used in an evaluation of the second intensity information item. Advantageously, these frequencies or frequency ranges also comprise frequencies outside the audible range of from about 16 Hz to about 20 kHz and lie, for example, in the ultrasonic range, so that the user is not affected by the emanating sound waves. The acoustic sensor element can in particular measure sound on the textile in transmission and/or reflection.

In one embodiment, a determination of the first and/or second intensity information item can be made via a sensor, wherein the sensor is arranged on a treatment device such as a cleaning device. For example, the sensor is at least partially arranged on the outer housing of a treatment device and outside a treatment container in which a treatment can be performed. The user therefore always has access to the sensor, even if the treatment device is in operation or switched off. Thus, a method according to the first aspect can be made at any time. The sensor can be fixed to the treatment device in this case, for example, via fastening element such as a screw connection and/or bonding. Likewise, the sensor can also be arranged freely positionable on the treatment device via a positioning element, for example, via a magnetic holder. A mobile device such as a smart pen can be provided, which is detachably arranged on and/or in the treatment device and can communicate with the treatment device, for example, via a cable and/or via radio, in particular in combination with a further mobile device such as a mobile telephone.

Furthermore, the sensor can be arranged at least partially in the interior of the treatment device, in particular in the region of a cleaning container of the cleaning device in which a cleaning can be performed. In particular, the sensor is arranged here at a position accessible to the user. The sensor can also be fixed to the treatment device here, for example, be freely positionable via a fastening element or via a positioning element. The sensor is arranged, for example, at an opening of the treatment container, in particular on a door. In a washing machine, the sensor is arranged, for example, on the loading hatch of the laundry drum and/or on the seal of the loading hatch.

Likewise, the sensor can be designed freely movable in the interior of the treatment container. In one embodiment, a determination device is provided, the determination device comprising: at least one sensor element for determining the intensity information item(s) and optionally at least one illumination element, wherein the device is configured to provide the first and/or second intensity information item during the performance of a cleaning strategy in a cleaning container of a cleaning device. For example, the determination device is configured to be arranged freely movably in a washing drum of a washing machine during a washing process. The determination device can have a shape corresponding to the cleaning treatment and, for example, have a rounded, in particular spherical shape. The determination device can also have a corresponding density and mechanical resistance, so that a washing solution and also aggressive cleaning agents do not affect the function of the detection device. The determination device can thus provide intensity information item(s) during a cleaning operation to monitor the cleaning strategy. A determination of the first intensity information item can be provided both for a soiling on the surface of a textile and/or can also comprise soilings such as dissolved textile constituents such as textile dyes, for example, by an examination of the washing solution. A determination of the first and/or second intensity information item can take place in transmission, reflection and/or emission.

In particular, at least one sensor, which is located at least partially outside the cleaning container, is combined with at least one sensor, which is located at least partially within the cleaning device or within the cleaning container and which in particular is freely movable. A plurality of sensors of the same or different design can be provided. This improves the accuracy of the determination of the at least one treatment parameter, since the sensors having different positions can provide corresponding intensity information items. In particular, at least one of the sensors operates continuously at least at times, so that intensity information items are obtained at different times and in particular continuously during a cleaning treatment.

Likewise, at least one sensor can be arranged on a part of a cleaning agent package and be integrated, for example, into a closure cap or be arranged on a closure flap, in particular by being plugged on. A dosing aid for the cleaning agent can be provided, wherein the sensor can be integrated into the dosing aid and in particular can be designed removable from the dosing aid. Thus, the sensor is free and movable independent of a cleaning device and can be used by the user in a simple way on a soiling of a textile. Likewise, the sensor can then be used in conjunction with a plurality of different treatment devices.

In a further embodiment of the method, the method further comprises: determining a user profile at least partially based on the at least one treatment parameter, in particular, based on a plurality of determined treatment parameters, wherein the determination of the at least one treatment parameter is based at least partially on the user profile. A user profile can thus be created via the treatment parameter, which profile is adapted to the respective composition of the soiling and the property of the textile. In particular, a plurality of treatment parameters in the context of a history of determined treatment parameters can be included in a user profile, so that future determinations can be based at least partially on the user profile. Thus, the determination of the at least one treatment parameter can be made adaptive and more precisely adapted to the respective requirements via the user profile. The determination of the treatment parameter can be performed more precisely, in particular with regard to the dependence on the chemical composition of the soiling and the property of the textile.

For example, a user profile can be created with respect to commonly occurring combinations of compositions of soilings and properties of the textiles. In particular, the cleaning agent type, cleaning agent composition and the type of cleaning device in a user profile can also be taken into account for the output of at least one parameter of a cleaning strategy.

It is also conceivable that an information item about the effectiveness of the treatment is recorded in the user profile. For example, after a cleaning process, an intensity information item can again be determined in order to determine the effectiveness of the cleaning strategy. This can further optimize future treatment strategies via the user profile.

Likewise, after the treatment, the user can make an assessment of the at least one treatment parameter, for example, an assessment of the effectiveness of the cleaning strategy, which enters into the user profile. Thus, a personal adaptation of the determination of the treatment parameter, in particular the cleaning strategy, can be achieved.

It is also possible that the determination of the at least one treatment parameter comprises a machine learning, in particular when using a user profile. For example, the user profile can be determined, at least in part, based on machine learning. Machine learning is understood as meaning an artificial system (for example, a device according to the second aspect or a system according to the third aspect) that learns, for example, from examples and can generalize them after the end of the learning phase. That is, the examples are not simply learned by heart, but rather patterns and principles are recognized in the learning data. Different approaches can be followed for this purpose. For example, supervised learning, partially supervised learning, unsupervised learning, empowered learning, and/or active learning can be used, in particular in conjunction with deep learning methods. Supervised learning can be done, for example, by employing an artificial neural network (such as a recurrent neural network) or by employing a support vector machine. Unsupervised learning can also take place, for example, by employing an artificial neural network (for example, an auto-encoder). For example, the repeatedly obtained and/or determined first and/or second intensity information items or the at least one treatment parameter serve as learning data.

Alternatively or additionally, it is conceivable that the obtained and/or determined intensity first and/or second information items or the at least one treatment parameter are associated with further information items, for example, with the number and/or the respective age of the persons of a household for creating a personal user profile or for example, with the season for the creation of a seasonal user profile.

In particular, the user profile can also be affected by further user profiles of other persons. For example, preferences and/or comparison values can be compared with those of other users or introduced as a suggestion. The evaluation of the intensity information item can be further optimized as part of such a crowd sourcing.

In a further embodiment of the method according to the first aspect, user-related information items are included in the determination of the at least one treatment parameter. An individualized treatment of the textile can be achieved, in particular with an individualized cleaning agent, via the inclusion of user-related information item.

The method according to the first aspect can comprise providing or triggering the provision of an individualized cleaning agent. The method according to the first aspect can comprise the packaging of an individualized cleaning agent, wherein the packaging contains in particular an information item about the composition of the cleaning agent, and/or the provision of a packaged individualized cleaning agent.

In particular, user-related information items can be provided by the user via a user interface in order to affect the determination of the at least one treatment parameter and/or to specify at least one treatment parameter. For example, the user can provide specifications on the properties of soiling, textile and/or user preferences. The user-related information items can be checked for compatibility with each another and/or for compatibility with the first and/or second intensity information item, in particular a compatibility with first and second intermediate variables such as a composition information item and/or soiling information item. In particular, the user can be notified of a possible incompatibility or such a display can be triggered.

For example, user-related information items about the soiling can be indicative of the chemical composition and thus the type of the soiling, the degree of soiling or the amount of soiling and/or the spatial distribution of the soiling, such as the form of the soiling, or a combination thereof.

User-related information items about the textile can comprise, for example, the material structure, material type, material distribution, a finishing of the material of the textile, color and/or color distribution of the textile, material wear of the textile, type and/or shape of a fabric, a knitted fabric, nonwoven fabric or fibrous web, the presence and/or the type of closure element, coating material and/or applications in, at and/or on the textile, or a combination thereof.

User preferences can comprise, for example, preferences with respect to fragrances, allergies, hygiene requirements, cleaning requirements, biodegradability, a preferred cleaning agent composition, or a combination thereof.

In particular, according to the first aspect, a structure sensor or surface sensor is used or according to the second aspect, in particular, a structure sensor is provided, which is configured to provide structure information item about a textile. In this case, the structure sensor can determine, for example, an information item about the shape, nature, appearance and composition of the textile and the material of the textile.

In a further embodiment of the method, at least one of the devices for performing the method is a mobile device. In particular, a communication can be made via a communication system between a mobile device, for example, a smart phone, laptop, tablet, wearable, smart watch, smart pen or a camera, and at least one further device, for example, a cleaning device and/or an optical sensor. One of the devices can also be a cleaning robot. According to one embodiment, the device according to the second aspect comprises a communication interface. For example, the communication interface is configured for wired or wireless communication. For example, the communication interface is a network interface. The communication interface is preferably configured to communicate with a communication system. Examples of a communication system are a local area network (LAN), a wide area network (WAN), a wireless network (for example, according to the IEEE 802.11 standard, the Bluetooth (LE) standard and/or the NFC standard), a wired network, a mobile network, a telephone network and/or the Internet. A communication system can comprise communication with an external computer, for example, via an Internet connection.

In particular, an optical sensor for determining the first and/or second intensity information item is provided and integrated into a mobile device. This facilitates the determination of the intensity information item(s) for the user. It is also conceivable that an optical sensor is provided in a treatment device and/or a mobile device is used to display the at least one treatment parameter.

In this case, an optical sensor is understood as meaning sensors which can determine an intensity of incident radiation, in particular electromagnetic radiation in the visible range and optionally beyond. In particular, the optical sensor is configured to provide a spatial resolution and/or a color information item of the radiation incident on the sensor. The optical sensor can comprise an image sensor, in particular a digital image sensor. In particular, at least one semiconductor element, diode, CCD element, for example, a Bayer sensor, or CMOS element, for example, a sensor of the type Foveon X3, can be used to determine the incident radiation. The optical sensor can contain optical filters and in particular a spectrometer. There can be further optical elements such as lenses and/or filters, for example, an external monochromator.

According to one embodiment of the method according to the first aspect, the method further comprises subjecting the first and/or intensity information item to a processing algorithm. In this way, on the one hand, a better differentiation of different compositions of the soiling of the textile and the property of the textile can be achieved. For example, the intensity information item is subjected to a conversion algorithm. For example, a conversion of the determined intensity information item (for example, one or more image information items) from a first representation space into a second representation space can be done, for example, from a first color space to a second color space. Examples of color spaces are, for example, an RGB color space or an L*a*b* color space. For example, the determined image information item is converted from an RGB color space into an L*a*b* color space.

An RGB color space is understood as meaning an additive color space, which reproduces color perceptions by the additive mixing of three basic colors (red, green and blue). An example of an L*a*b* color space is, for example, the CIELAB color space, which is standardized in EN ISO 11664-4 "Colorimetry—Part 4: CIE 1976 L*a*b* Colour space" (CIE 1976 color space). It is advantageous here that colors are defined independently of the type of their generation or reproduction technique, as they are perceived by a normal observer in a standard lighting condition (device independence and perception relatedness).

In particular, an evaluation of color differences between pixels of an image information item can be made to determine the at least one treatment parameter. $\Delta E$ can be used for this purpose, in particular methods based on the color difference or the color distance. In particular, the calculation of $\Delta E$ is made in the CIELAB color space. Likewise, the brightness in the intensity information item can be used to determine the at least one treatment parameter.

According to the second aspect of the present disclosure, an alternative device is also described, comprising at least one processor and at least one memory having computer program code, wherein the at least one memory and the computer program code are configured to execute and/or to control at least one method according to the first aspect with the at least one processor. For example, a processor is understood as meaning a control unit, a microprocessor, a microcontrol unit such as a microcontroller, a digital signal processor (DSP), an application specific integrated circuit (ASIC), or a field programmable gate array (FPGA).

For example, an exemplary device further comprises features for storing information item such as a program memory and/or a main memory. For example, an exemplary device as contemplated herein further comprises features for receiving and/or sending information items over a network, such as a network interface. For example, exemplary devices as contemplated herein are connected to each other and/or connectable to each other via one or more networks.

An exemplary device according to the second aspect is or comprises, for example, a data processing system that is configured in terms of software and/or hardware in order to be able to execute the respective steps of an exemplary method according to the second aspect. Examples of a data processing system include a computer, a desktop computer, a server, a thin client and/or a portable computer (mobile device), such as a laptop computer, a tablet computer, a wearable, a personal digital assistant or a smart phone.

Individual method steps of the method according to the first aspect (for example, obtaining or determining an intensity information item, determining the at least one treatment parameter and/or determining the user profile) can in this case be performed using a sensor device which also has at least one sensor element. Likewise, individual method steps (for example, obtaining or determining intensity information items, determining the at least one treatment parameter and/or determining a user profile), which, for example, need not necessarily be performed directly with the sensor device, can be made by a further device, which in particular communicates with the device which has at least one sensor element via a communication system.

Further devices can be provided, for example, a server and/or, for example, a part or a component of a so-called computer cloud, which provides data processing resources dynamically to different users in a communication system. A computer cloud is understood, in particular, as meaning a data processing infrastructure as defined by the National Institute for Standards and Technology (NIST) for the English term "cloud computing". An example of a computer cloud is a Microsoft Windows Azure Platform.

According to the second aspect of the present disclosure, there is also described a computer program comprising program instructions that cause a processor to execute and/or control a method according to the first aspect when the computer program is run on the processor. An exemplary program as contemplated herein can be stored in or on a computer-readable storage medium containing one or more programs.

According to the second aspect of the present disclosure, there is also described a computer-readable storage medium containing a computer program according to the second aspect. A computer-readable storage medium can be formed, for example, as a magnetic, electrical, electro-magnetic, optical and/or other type of storage medium. Such a computer-readable storage medium is preferably graphical (that is, "touchable"), for example, it is formed as a data carrier device. Such a data carrier device is for example, portable or permanently installed in a device. Examples of such a data carrier device are volatile or non-volatile random access memory (RAM) such as NOR flash memory or having sequential access such as NAND flash memory and/or read-only access memory (ROM) or read-write access. For example, computer readable is to be understood as meaning that the storage medium can be read and/or written by a computer or a data processing system, for example, by a processor.

According to the third aspect of the present disclosure, there is also described a system comprising a plurality of devices, in particular, a mobile device and a treatment device, which together perform a method according to the first aspect.

An exemplary system according to the third aspect comprises an exemplary treatment device and additionally a further device, for example, a mobile device or a server for performing an exemplary method according to the first aspect.

The exemplary embodiments of the present disclosure described above in this description are also to be understood as being disclosed in all combinations with one another. In particular, exemplary embodiments are to be understood in terms of the different aspects disclosed.

In particular, the preceding or following description of method steps according to preferred embodiments of a method also discloses corresponding features for performing the method steps by preferred embodiments of a device. Likewise, the disclosure of employing a device for performing a method step is intended to also disclose the corresponding method step.

Further advantageous exemplary embodiments of the present disclosure can be found in the following detailed description of some exemplary embodiments of the present disclosure, in particular, in conjunction with the figures. However, the figures should only serve the purpose of clarification, but not to determine the scope of the present disclosure. The figures are not to scale and are merely intended to reflect the general concept of the present disclosure. In particular, features included in the figures should by no means be considered as a necessary component of the present disclosure.

Figure 3:
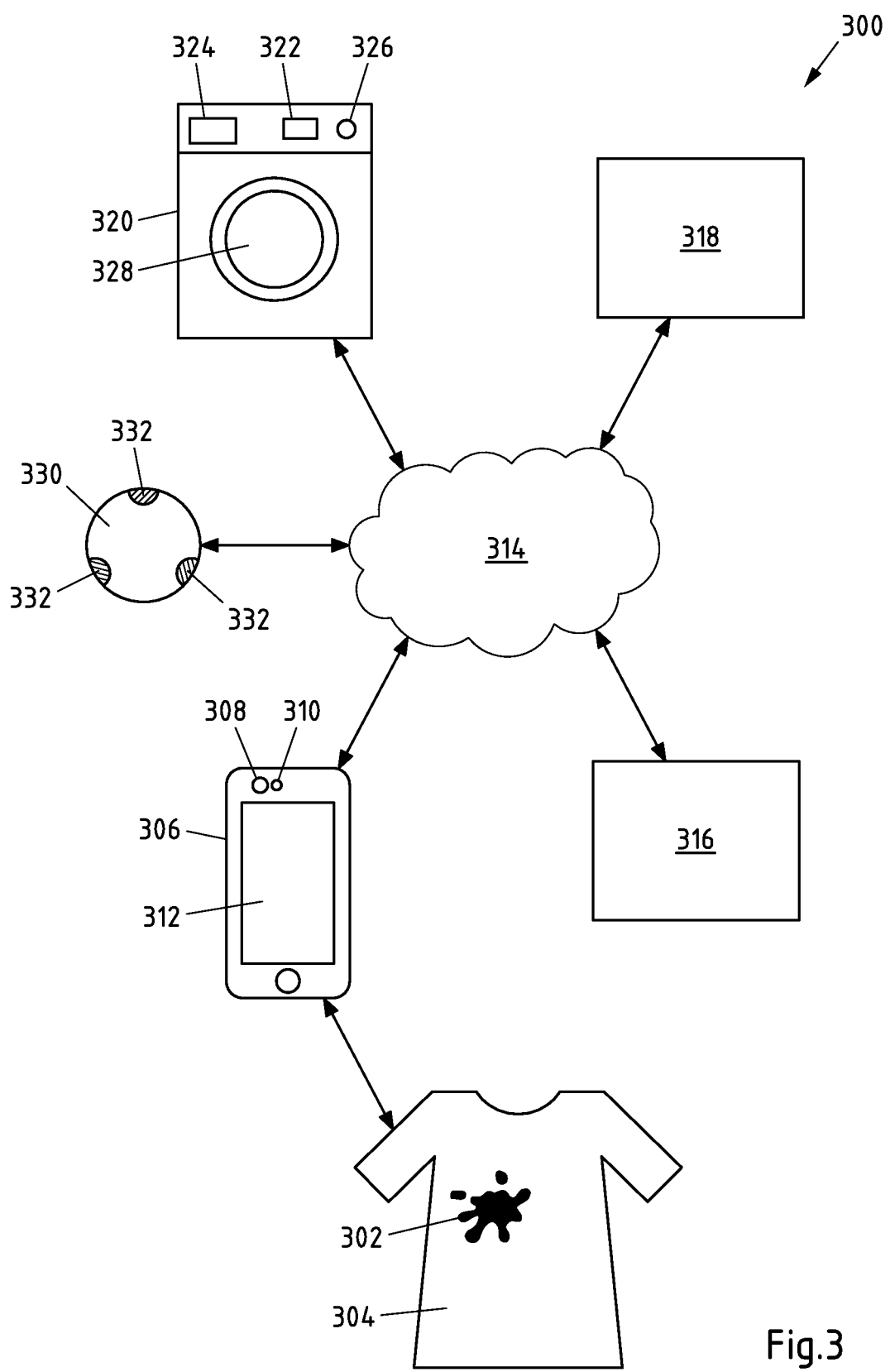
FIG. 3 is a schematic representation of an embodiment of a device.
Figure 4:
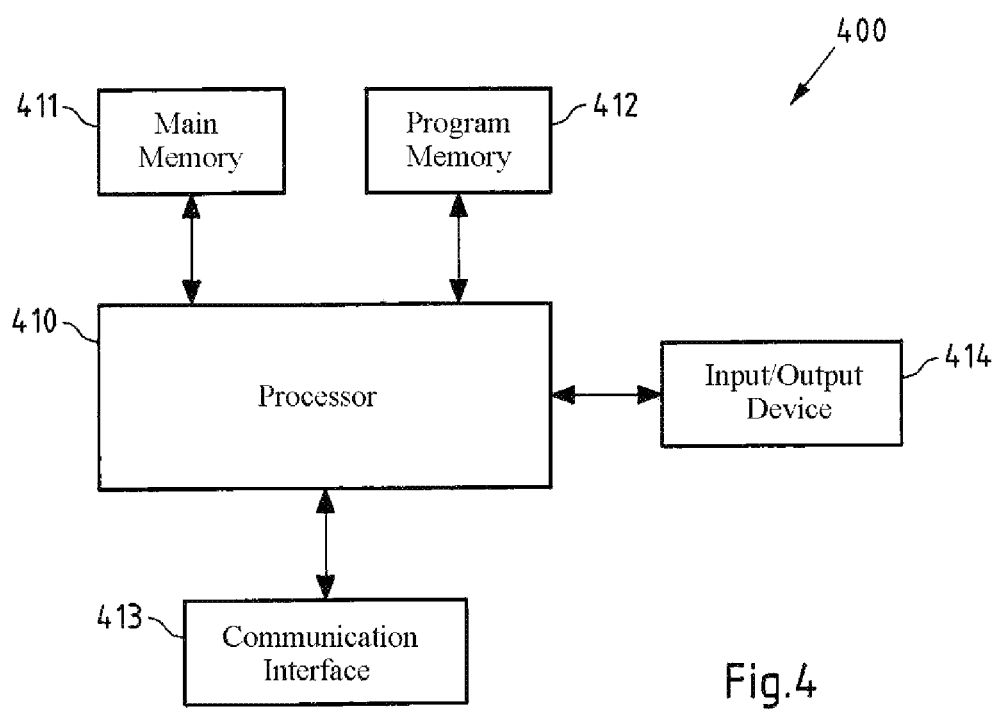
FIG. 4 is a block diagram of an embodiment of a device.

FIG. 1 shows a flowchart 100 of an embodiment of a method according to the first aspect, which can be performed by a device, for example, one of the devices from FIG. 3 and/or FIG. 4.

In the action 102, a first intensity information item is determined, for example, in the form of an intensity distribution via an optical sensor, wherein the first intensity distribution is representative of a spectral image resulting from an illuminated surface of soiling on a textile. In particular, the intensity distribution is representative of a hyperspectral image and comprises intensity values in multiple channels for different energy intervals, wherein at least two of the energy intervals adjoin or overlap each another. This first intensity distribution is obtained in action 104.

In the action 106, a second intensity information item is determined, for example, via an optical sensor, wherein the second intensity distribution is characteristic of at least one property of at least one part of the textile (in this example for at least a portion of the structure, wherein, however, other properties can be used). For example, the intensity distribution is representative of a spatially resolved image and/or a spectral image of the property of the textile and/or a marking of the textile. This second intensity distribution is obtained in action 108.

Since the first intensity distribution depends on the chemical composition of the soiling of the textile and the second intensity distribution depends on the property of the textile, in action 110, at least one treatment parameter depending on both the composition of the soiling and the property of the textile can be determined from the first and second intensity distribution. In this case, for example, at least one parameter of a cleaning strategy of the soiled textile is determined based on the chemical composition of the soiling and the property of the textile, wherein the cleaning strategy represents a recommendation for an optimal cleaning of the textile from the soiling. In this case, an optimal recommendation can be made with regard to the present specific combination of soiling composition and textile structure, so that on the one hand, the soiling is removed as effectively as possible and on the other hand, the structure of the textile is preserved.

Optionally, the actions 112 and/or 114 can be provided with which are determined at least one first intermediate parameter from the first intensity information item and at least one second intermediate parameter from the second intensity information item. Here, as indicated by the arrow 116, the determination of the first intermediate parameter is based in part on the second intermediate parameter and/or vice versa. For example, the structure of the textile is identified via the second intensity information item and detected by the at least one second intermediate parameter in action 114. The structure of the textile is then taken into account in the evaluation of the first intensity information item for at least one first intermediate parameter in action 112, which indicates, for example, the chemical composition of the soiling. For example, soilings having the same composition can give a different appearance to textiles having different structure. Due to the fact that the determination of the composition information item is based in part on the structure information item, a corresponding influencing of the first intensity information item by the property of the textile can be taken into account in the determination of the treatment parameter. Consequently, the first intensity information item can be evaluated more accurately and the composition information item can be determined more accurately, which leads overall to an improved recommendation of the treatment parameter.

An output of the at least one treatment parameter is caused in action 118, for example, an output on a display element, wherein in particular, indications of the composition of the soiling and the property of the textile and at least one treatment parameter are displayed to the user. The user can perform a cleaning of the textile based on the displayed information item or recommendation.

Additionally or alternatively, in action 120, an output of the at least one treatment parameter, in particular of the at least one parameter of the cleaning strategy, can be made to a treatment device. The output treatment parameters are used in action 122 to perform a treatment by employing the treatment device.

In addition, in action 124, a user profile can be determined which is based at least in part on the treatment parameter. Thus, the determination of the at least one treatment parameter can be made adaptive and more precisely adapted to the respective requirements via the user profile.

Figure 2:
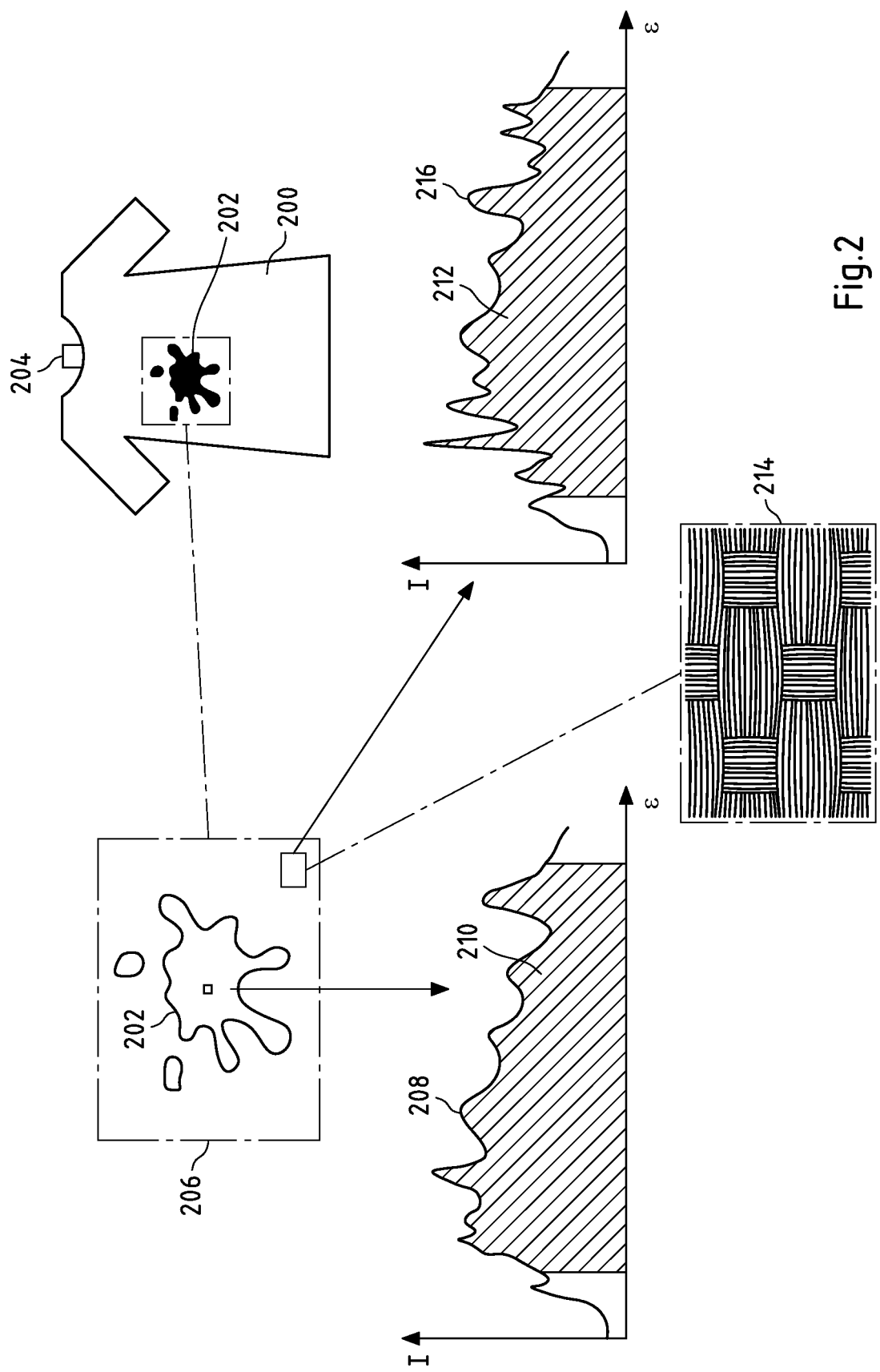
FIG. 2 is a schematic representation of first and second intensity information items.

FIG. 2 shows a schematic representation of a textile 200 having a soiling 202 and a marking 204. A spectral image 206 results in particular from the illumination of the surface of the structure of the textile 200 and the soiling 202 with radiation, wherein in particular radiation emanates from the surface by reflection and emission, which radiation can be physically measured, in particular via an optical sensor. An intensity distribution, which is representative of the spatial resolution of the spectral image 206, can be recorded in particular via a plurality of sensor elements, for example, pixels, wherein the pixels are arranged two-dimensionally on a surface. For example, the optical sensor is a camera in a mobile device or in a treatment device.

A first intensity information item 210 is shown which is representative of spectral portions of the spectral image 206. The spectrum 208 results for a limited spatial section of the spectral image 206, which is representative of the soiling 202. If the spectrum 208 is measured via an optical sensor element, for example, a pixel of an optical sensor, a first intensity information item 210 can be obtained, wherein the first intensity information item 210 is representative of the spectral image 206 resulting from the illuminated surface of the soiling 202 on the textile 200. The first intensity distribution 210 is shown in FIG. 2 as a hatched area. For example, the first intensity information item 210 is in this case representative of a hyperspectral image, wherein the first intensity information item 210 comprises values in at least 20 channels to 250 channels, wherein each channel representing an intensity for one energy interval. The first intensity information item 210 has intensity values in channels for energy intervals, wherein the energy intervals adjoin or overlap each another. Thus, the first intensity information item 210 is representative of an at least partially continuous spectrum.

In addition, the first intensity information item 210 is representative of spectral components of the spectral image 208 that lie outside the visible energy range. The first intensity information item 210 is also representative of spectral components from the infrared energy range to the ultraviolet energy range. This has the particular advantage that information items not visible to the naked eye, which are indicative of the composition of the soiling, can also be recorded via the first intensity information item 210.

A second intensity information item 212, 214 characteristic of at least one property of at least one part of the textile 200 is determined over a limited spatial section of the spectral image 206, which represents the property of the textile 200. For example, the second intensity information item 212—as already carried out for the first intensity information item 210—is representative of a spectrum 216, in particular representative of a hyperspectral image. Also, a spatial resolution of the spectral image 206 can be used, for example, an image information item, and can be comprised by the second intensity information item 214.

The second intensity information item 212, 214 is thus characteristic for at least one property of at least one part of the textile 200. In particular, the composition of the structure of the textile 200 and thus the material type, coatings and/or applications can be identified via the second intensity information item 212 representative of the spectrum 216. Furthermore, for example, the color of the textile can be determined via the second intensity information item 212 representative of the spectrum 216. For example, the fabric type, fiber strength, fiber density and/or thickness of the fabric can be determined from the second intensity information item 214 representative of the spatial resolution in order to affect the determination of the treatment parameter.

Alternatively or additionally, the second intensity information item can also be representative of a spectral image, in particular of an image information item of the marking 204. The marking is, for example, a label having a description of the composition of the textile and/or care instructions. In particular, a text recognition of an inscription of the marking 204 is performed.

FIG. 3 shows an embodiment of a device 300 according to the second aspect or a system according to the third aspect. The device 300 is configured as or comprises corresponding features for performing and/or controlling a method according to the first aspect.

In particular, the device 300 allows the recommendation for at least one treatment parameter or for a cleaning strategy for removing the soiling 302 from the textile 304.

A first intensity distribution representative of a spectral image resulting from the illuminated surface of the soiling 302 and a second intensity information item characteristic of at least one property of at least one part of the textile 304 are determined using a mobile device, here a smart phone 306. For this purpose, in particular an optical sensor 308 is used, which can comprise a hyperspectral camera, for example. In addition, a radiation source 310 is provided which serves to illuminate the surface of the soiling 302. The smart phone 306 also has a display element 312.

The determined first and second intensity distribution is obtained from a communication system 314. A determination device 316 communicates with the communication system 314, which determination device is configured to determine at least one treatment parameter dependent on the composition of the soiling 302 and the property of the textile 302 from the first and second energy distribution.

The determination of the treatment parameter in this case comprises a comparison of the first and/or second intensity distribution with comparison values. The comparison values are stored in a database 318, which is also in communication with the communication system 314. In particular, the comparison values of database 318 contain intensity distributions of soilings and properties of textiles typically occurring in the household. Furthermore, the database 318 contains data associated with the comparison values in the form of a chemical composition, specifications for the material type and form of textiles and parameters with regard to a cleaning strategy to be recommended which is optimal for the corresponding combination of composition and property.

The treatment parameters comprise parameters of such a cleaning strategy, wherein the parameter specifies a cleaning agent type, an amount of cleaning agent, a cleaning temperature, a type of cleaning device and settings of a cleaning device 320. These treatment parameters can be displayed, for example, on the display element 312 of the smart phone 306 and thus made available to the user. The user is thus provided with a recommendation about an optimal cleaning strategy for the specific combination of soiling 302 and textile 304.

The cleaning device 320 is also in communication with the communication system 314, whereby the treatment parameters are output to the cleaning device 320. The cleaning device 320 has a display element 322, which in particular can display the treatment parameters. Furthermore, the cleaning device 320 has a dosing device 324 for cleaning agents. In this case, the dosing device 324 can provide a cleaning agent in accordance with the parameters of the cleaning strategy with respect to the cleaning agent type and/or the amount of cleaning agent, or check whether the cleaning agent has been introduced into the dosing device 324 in accordance with the recommended cleaning strategy.

Furthermore, the cleaning device 320 has an operating element 326, which allows the control of the cleaning device 320 by a user. The cleaning device 320 adopts the parameters of the cleaning strategy as a default in this case. The user then has the option of following the recommendation of the cleaning strategy and simply starting the cleaning device 320 via the operating element 326 or performing one's own manual setting of the cleaning device 320 via the operating element 326. The cleaning is performed in a cleaning container 328, here a laundry drum.

Furthermore, a determination device 330 is shown in FIG. 3. The determination device 330 comprises sensor elements 332 and optionally at least one illumination element (not shown). The determination device has a spherical shape and is configured to be arranged in the cleaning container 328 while performing a cleaning. The determination device 330 is in this case freely movable and resistant to an action of the washing solution in the cleaning container 328. The determination device 330 can thus provide first and second intensity distributions during a cleaning operation in order to monitor the cleaning strategy. The determination device 330 can also detect intensity distributions of soluble, unfixed textile dyes in the washing solution. Thus, a dissolving of the corresponding textile dyes from the textile 304 can be monitored.

FIG. 4 shows a block diagram of an embodiment of a device 400, which, in particular, can execute an exemplary method according to the first aspect. The device 400 is, for example, a device according to the second aspect or a system according to the third aspect.

The device 400 can be, for example, a computer, a desktop computer, a server, a thin client, or a portable computer (mobile device), such as a laptop computer, a tablet computer, a personal digital assistant (PDA), or a smart phone. For example, the device can fulfill the function of a server or a client.

Processor 410 of device 400 is particularly formed as a microprocessor, microcontrol unit, microcontroller, digital signal processor (DSP), application specific integrated circuit (ASIC) or field programmable gate array (FPGA).

Processor 410 executes program instructions stored in program memory 412 and, for example, stores intermediate results or the like in working or main memory 411. For example, program memory 412 is a nonvolatile memory such as a flash memory, a magnetic memory, an EEPROM memory (electrically erasable programmable read only memory), and/or an optical memory. Main memory 411 is, for example, a volatile or non-volatile memory, in particular, a random access memory (RAM) such as a static RAM (SRAM), a dynamic RAM (DRAM), a ferroelectric RAM (FeRAM), and/or a magnetic RAM memory (MRAM).

Program memory 412 is preferably a local data carrier permanently attached to device 400. Data carriers permanently connected to the device 400 are, for example, hard disks which are built into the device 400. Alternatively, the data carrier may, for example, also be a data carrier which can be connected in separable manner to the device 400, such as a memory stick, a removable data carrier, a portable hard disk, a CD, a DVD and/or a diskette.

Program memory 412 contains, for example, the operating system of device 400, which is at least partially loaded into main memory 411 and executed by processor 410 when device 400 is started. In particular, when device 400 starts, at least one part of the kernel of the operating system is loaded into main memory 411 and executed by processor 410. The operating system of device 400 is, for example, a Windows, UNIX, Linux, Android, Apple iOS, and/or MAC operating system.

In particular, the operating system enables the use of the device 400 for data processing. It manages, for example, resources such as main memory 411 and program memory 412, network interface 413, input and output device 414, provides basic functions, among other things through programming interfaces, to other programs and controls the execution of programs.

Processor 410 controls the communication interface 413, which can be, for example, a network interface and can be in the form of a network card, network module and/or modem. The communication interface 413 is, in particular, configured to establish a connection of the device 400 to other devices, in particular, via a (wireless) communication system, for example, a network, and to communicate with them. The communication interface 413 can, for example, receive data (via the communication system) and forward it to processor 410 and/or receive and send data (via the communication system) from processor 410. Examples of a communication system are a local area network (LAN), a wide area network (WAN), a wireless network (for example, according to the IEEE 802.11 standard, the Bluetooth (LE) standard and/or the NFC standard), a wired network, a mobile network, a telephone network and/or the Internet.

Furthermore, processor 410 can control at least one input/output device 414. Input/output device 414 is, for example, a keyboard, a mouse, a display unit, a microphone, a touch-sensitive display unit, a loudspeaker, a reading device, a drive and/or a camera. For example, input/output device 414 can receive inputs from a user and forward them to processor 410 and/or receive and output information items to the user of processor 410.

Figure 5:
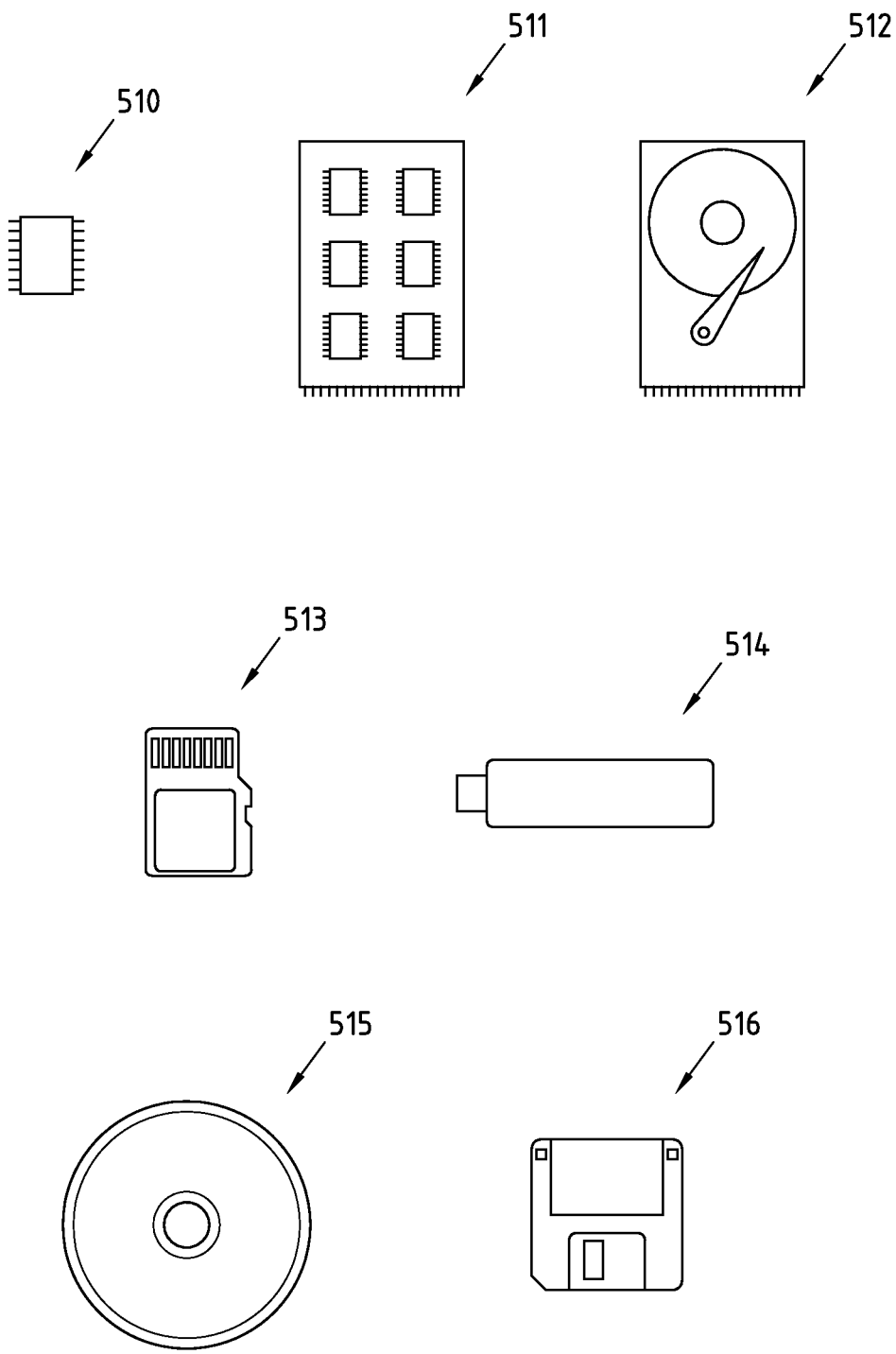
FIG. 5 illustrates different embodiments of a storage medium.

Finally, FIG. 5 shows different embodiments of storage media on which an embodiment of a computer program as contemplated herein can be stored. The storage medium can be, for example, a magnetic, electrical, optical and/or other type of storage medium. For example, the storage medium can be part of a processor (for example, processor 410 of FIG. 4), such as a (non-volatile or volatile) program memory of the processor or a part thereof (such as program memory 412 in FIG. 4). Embodiments of a storage medium are a flash memory 510, an SSD hard disk 511, a magnetic hard disk 512, a memory card 513, a memory stick 514 (for example, a USB stick), a CD-ROM or DVD 515, or a diskette 516.

The exemplary embodiments of the present disclosure described in this specification and the respective optional features and properties cited in this context should also be understood to be disclosed in all combinations with one another. In particular, the description of a feature encompassed by an exemplary embodiment is, unless explicitly explained to the contrary, not to be understood in this case as meaning that the feature is essential or fundamental for the function of the embodiment. The sequence of the method steps described in this specification in the individual flowcharts is not mandatory, alternative sequences of the method steps are conceivable. The method steps can be implemented in various ways, so that an implementation in software (by program instructions), hardware, or a combination of both to implement the method steps is conceivable.

Terms used in the patent claims, such as "comprising", "having", "including", "containing" and the like, do not exclude further elements or steps. The phrase "at least partially" includes both the "partial" and "completely" cases. The phrase "and/or" is to be understood as meaning that both the alternative and the combination is intended to be disclosed, that is, "A and/or B" means "(A) or (B) or (A and B)". The use of the indefinite article does not exclude a plurality. A single device can execute the functions of a plurality of units or devices mentioned in the patent claims. Reference numerals indicated in the claims are not to be regarded as limitations on the elements and steps used.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the various embodiments in any way. Rather, the foregoing detailed description will provide those skilled in the art with a convenient road map for implementing an exemplary embodiment as contemplated herein. It being understood that various changes may be made in the function and arrangement of elements described in an exemplary embodiment without departing from the scope of the various embodiments as set forth in the appended claims.

The invention claimed is:

1. A method performed by one or more devices, comprising:
   obtaining a first intensity information item of a spectral image resulting from soiling of a textile;
   determining at least one first intermediate parameter dependent on the first intensity information item;
   obtaining a second intensity information item of a spectral image of at least one property of at least one part of the textile;
   determining a second intermediate parameter dependent on the second intensity information item;
   determining at least one treatment parameter, wherein the determination of the treatment parameter comprises comparing the first and second intermediate parameters; and
   outputting or triggering an outputting of the at least one treatment parameter,
   wherein:
      a first set of treatment parameters is set up with regard to the composition of the soiling,
      a second set of treatment parameters is set up with regard to the at least one property of the at least one part of the textile,
      the first set of treatment parameters and the second set of treatment parameters comprise ranges, and
      the first and second treatment parameters are selected based on the greatest possible overlap of the ranges of the first and second set of treatment parameters.

2. The method according to claim 1, wherein the first intensity information item of a spectral image results from an illuminated surface of the soiling on the textile.

3. The method according to claim 2, wherein the second intensity information item is of a spectral image resulting from an illuminated surface of at least one part of the structure of the textile and/or is of a spectral image resulting from an illuminated surface of a marking on the textile.

4. The method according to claim 2, wherein the second intensity information item is of a spectral image of the type of materials of the textile, the color of the textile and/or for the form of the fabric of the textile.

5. The method according to claim 1, wherein the second intensity information item of a spectral image results from an illuminated surface of at least one part of the structure of the textile and/or results from an illuminated surface of a marking on the textile.

6. The method according to claim 5, wherein the second intensity information item is of a spectral image of the type of materials of the textile, the color of the textile and/or for the form of the fabric of the textile.

7. The method according to claim 1, wherein the second intensity information item of a spectral image of the type of materials of the textile, the color of the textile and/or for the form of the fabric of the textile.

8. The method according to claim 1, wherein the determination of the at least one treatment parameter comprises the determination of a composition information item of the soiling from the first intensity information item and/or the determination of a structure information item of the textile from the second intensity information item.

9. The method according to claim 8, wherein the determination of the composition information item is based in part on the structure information item and/or the determination of the structure information item is based in part on the composition information item.

10. The method according to claim 1, wherein the at least one treatment parameter comprises at least one parameter of a cleaning strategy of the textile.

11. The method according to claim 1, wherein the at least one treatment parameter is output to a treatment device.

12. The method according to claim 1, the method further comprising:
   performing a treatment of the textile via a treatment device.

13. The method according to claim 1, the method further comprising:
   determining the first intensity information item and/or second intensity information item.

14. The method according to claim 1, wherein the first intensity information item and/or second intensity information item are of spatially resolved portions of a spectral image.

15. The method according to claim 1, the method further comprising:
   determining a user profile based at least in part on the treatment parameter,
   wherein the determination of the at least one treatment parameter is based at least partially on the user profile.

16. The method according to claim 1, wherein determining the at least one treatment parameter comprises a machine learning method.

17. A device comprising:
   at least one processor; and
   at least one memory having computer program code, wherein the at least one memory and the computer program code are configured with the at least one processor to execute and/or to control at least one method of:
- obtaining a first intensity information item of a spectral image resulting from soiling of a textile;
- determining at least one first intermediate parameter dependent on the first intensity information item;
- obtaining a second intensity information item of a spectral image of at least one property of at least one part of the textile;
- determining a second intermediate parameter dependent on the second intensity information item;
- determining at least one treatment parameter, wherein the determination of the treatment parameter comprises comparing the first and second intermediate parameters; and
- outputting or triggering an outputting of the at least one treatment parameter, wherein:
- a first set of treatment parameters is set up with regard to the composition of the soiling,
- a second set of treatment parameters is set up with regard to the at least one property of the at least one part of the textile,
- the first set of treatment parameters and the second set of treatment parameters comprise ranges, and
- the first and second treatment parameters are selected based on the greatest possible overlap of the ranges of the first and second set of treatment parameters.

18. A computer program comprising program instructions that cause a processor to execute and/or control a method when the computer program is run on the processor, the method comprising:
- obtaining a first intensity information item of a spectral image resulting from soiling of a textile;
- determining at least one first intermediate parameter dependent on the first intensity information item;
- obtaining a second intensity information item of a spectral image of at least one property of at least one part of the textile;
- determining a second intermediate parameter dependent on the second intensity information item;
- determining at least one treatment parameter, wherein the determination of the treatment parameter comprises comparing the first and second intermediate parameters; and
- outputting or triggering an outputting of the at least one treatment parameter, wherein:
- a first set of treatment parameters is set up with regard to the composition of the soiling,
- a second set of treatment parameters is set up with regard to the at least one property of the at least one part of the textile,
- the first set of treatment parameters and the second set of treatment parameters comprise ranges, and
- the first and second treatment parameters are selected based on the greatest possible overlap of the ranges of the first and second set of treatment parameters.

* * * * *